United States Patent
Schory, III

(10) Patent No.: US 8,999,148 B1
(45) Date of Patent: Apr. 7, 2015

(54) SYSTEMS AND METHODS FOR WASTE OIL RECOVERY

(71) Applicant: Environmental Management Alternatives, Inc., St. Louis, MO (US)

(72) Inventor: Robert G. Schory, III, North Canton, OH (US)

(73) Assignee: Enviromental Management Alternatives, Inc., St. Louis, MS (US)

(*) Notice: Subject to any disclaimer, the term of this patent is extended or adjusted under 35 U.S.C. 154(b) by 284 days.

(21) Appl. No.: 13/770,833

(22) Filed: Feb. 19, 2013

Related U.S. Application Data

(60) Provisional application No. 61/599,666, filed on Feb. 16, 2012, provisional application No. 61/647,978, filed on May 16, 2012.

(51) Int. Cl.
*C10G 33/04* (2006.01)
*C02F 9/04* (2006.01)
*C02F 9/00* (2006.01)
*C02F 1/68* (2006.01)
*C02F 101/32* (2006.01)

(52) U.S. Cl.
CPC ...................................... *C10G 33/04* (2013.01)

(58) Field of Classification Search
CPC .............. C02F 1/00; C02F 1/34; C02F 1/68; C02F 1/682; C02F 9/00; C10G 33/00; C10G 33/06; C10G 33/04; C10G 21/006; C10G 21/06; C10G 21/12; C10G 21/14; C10G 21/16; C10G 21/20; C10G 21/24; B01D 17/047

See application file for complete search history.

(56) References Cited

U.S. PATENT DOCUMENTS 5,882,506 A * 3/1999 Ohsol et al. .................. 208/188
6,395,166 B1 5/2002 Haydock

OTHER PUBLICATIONS

"Ohsol Emulsion Breaking Process for Refinery Desalter Optimization," BriteWater International, 2010, 8 pages.
Biello, D., "Can Oil Be Recycled?", Scientific American, http://www.scientificamerican.com/article.cfm?id=can-oil-be-recycled&print=true, Aug. 25, 2009, 3 pages.
"Petroleum Wastewater—Desalter Case Study," Ask Tom! Column, Water and Wastewater1.com, undated, 6 pages.
Rhee, C., et al., "Removal of Oil and Grease in OII Processing Wastewaters," undated, 15 pages.
"Petroleum Refineries Waste Water Treatment System Emission Test Report, Chevron USA, Inc. El Segundo Refinery, El Segundo, California," Environmental Protection Agency, Mar. 1984, 13 pages, EMB Report 83-WWS-2.

* cited by examiner

*Primary Examiner* — Walter D Griffin
*Assistant Examiner* — Derek Mueller
(74) *Attorney, Agent, or Firm* — Lewis Rice LLC

(57) ABSTRACT

Systems and methods to improve the removal and capture of oil from wastewater streams. The water and oil mixture (wastewater) is diluted and treated to provide better solubilization of hydrophilic and hydrophobic fractions using captive water and a diluent. Two additives are added to demulsify and disperse polymeric and non-hydrocarbon insolubles and layer separation is performed on the treated wastewater to segregate oil and water.

19 Claims, 1 Drawing Sheet

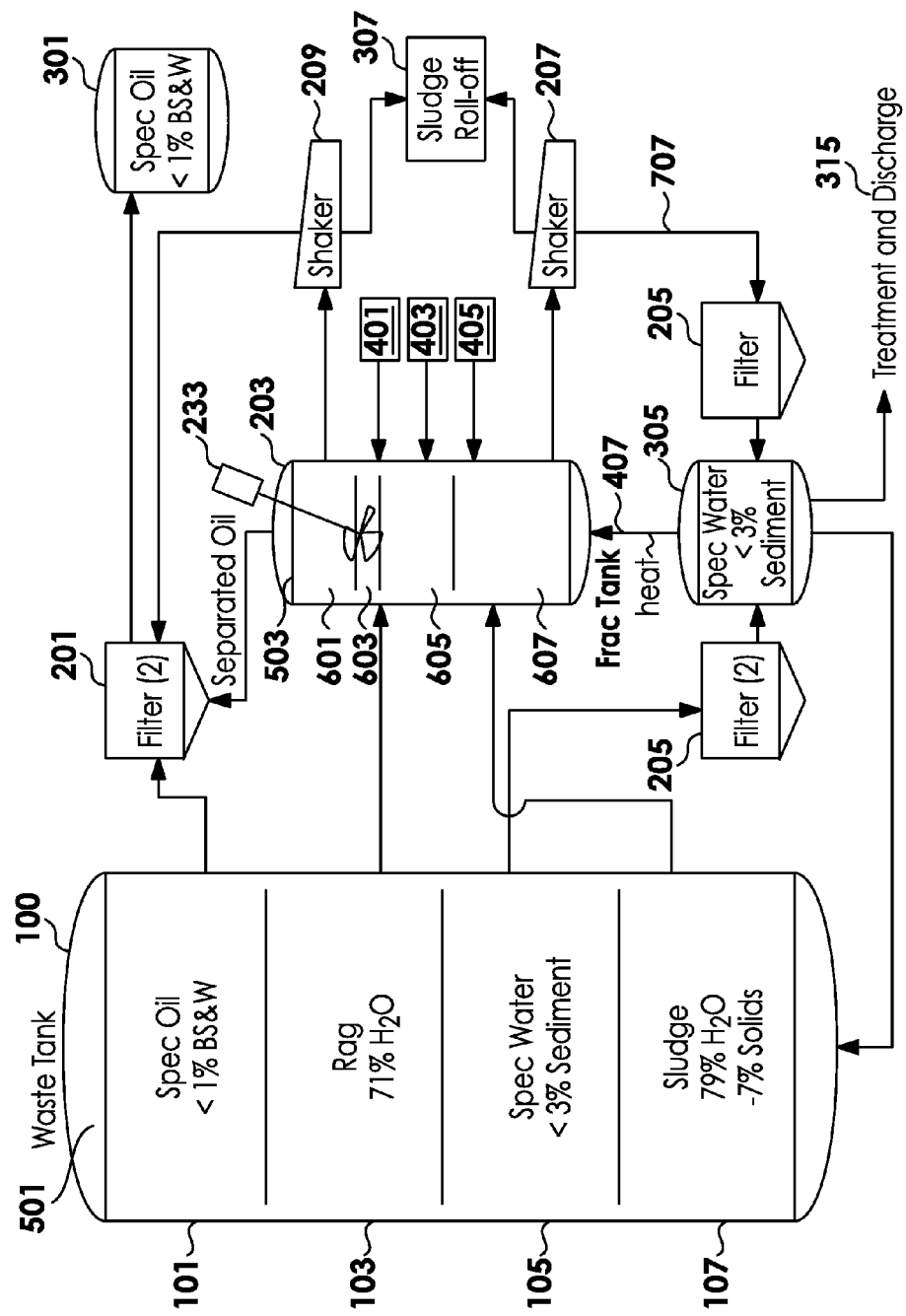

SYSTEMS AND METHODS FOR WASTE OIL RECOVERY

CROSS REFERENCE TO RELATED APPLICATION(S)

This application claims the benefit of U.S. Provisional Patent Application Ser. No. 61/599,666, filed Feb. 16, 2012, and claims the benefit of U.S. Provisional Patent Application Ser. No. 61/647,978, filed May 16, 2012. The entire disclosure of both references is herein incorporated by reference.

BACKGROUND

1. Field of the Invention

This disclosure is related to the field of oil recovery from mixtures including oil, water, and contaminants. Specifically to oil recovery from mixtures of water from oil refinery or other hydrocarbon handling operations.

2. Description of the Related Art

Oil refining in order to convert crude oil into products such as gasoline, diesel, and the petroleum-based materials common in modern society is a complicated and generally messy process. Crude oil is not a simple material but a complex mixture including many different hydrocarbons and other materials whose exact composition can vary widely from oil field to oil field. The refinery process, therefore, is often focused on removing contaminants from the basic crude oil to allow the hydrocarbon compounds to be refined into more useful compounds. These contaminants are often water, and solids which may be suspended in the water or oil. Specifically crude oil having less than 1% Basic Sediment and Water (BS&W) is generally considered ready for processing regardless of its particular hydrocarbon composition.

There are a number of steps which occur in the refining including, but not limited to, desalting and dewatering which produce a water-based effluent. This effluent is generally stored in tanks, ponds, or other storage facilities until it can be clarified and cleaned and the water present therein can be returned to the environment. Traditionally, the principle concern with this effluent mix was the safe disposal of contaminants (including remaining hydrocarbons or waste oil) and clarification of water for return or reuse.

Refinery waste streams, and, in fact, many types of wastewater from other industries which routinely handle hydrocarbon operations, are laden with both hydrocarbons such as, but not limited to crude oil, as well as a number of solid contaminants. This wastewater cannot be discharged to the environment as it can be generally toxic to water ecosystems, and most standard water treatment plants are unable to handle the specific materials produced in such hydrocarbon operations. Specifically, they often cannot remove the waste oil that is present.

In addition to wastewater streams from refineries including waste oil, waste oil is also generated in other processes. For example operations of automotive or other engines generally utilize oil (usually called engine oil, motor oil, or crankcase oil) in order to lubricate parts. This oil needs to be periodically replaced as the oil will, over time, become contaminated with particulates (ash) which can interfere with engine operation. Specifically, the engine oil is designed to capture and hold these particulates in suspension to prevent them from being contacted by moving parts of the engine and potentially causing damage. However, as more of them become captured, the oil will thicken and its ability to lubricate, and retain additional particles, is decreased.

Traditionally, used engine oil was simply disposed of. However, the oil is not fundamentally damaged by the lubrication process (in most cases) and can be reused if the oil can be cleaned to remove the captured particulates, additives which may be added to improve its function, and water which generally also contaminates used engine oil through exposure over time. The oil can then be re-refined into useful products.

Traditional systems for separating oil from water and solids utilize well known properties of the materials. Namely, hydrocarbons are generally insoluble in water and will float on top of water. Thus, traditional separation of water from hydrocarbons in all sorts of tanks relies on agitation, followed by simple gravity separation. This type of wastewater treatment effectively places the wastewater in a vessel, agitates it, and then allows it to phase so solids settle to the bottom of the tank, water separates to the middle, and hydrocarbons go to the top. The water and hydrocarbons can then be separated by pumping from differential levels. Alternatively, wastewater can be centrifuged, cycloned, or otherwise handled in a manner which utilizes the same properties in a slightly different manner.

While these processes are generally sufficiently good at segregating oil, water, and solids to allow for the separated hydrocarbons (oil) to be processed, the water to be cleaned using known processes, and solids to be collected, it is not a process which is particularly effective at capturing the oil present in the wastewater. Specifically, while the existing basic agitation processes can separate easily separable components, there is generally a fourth layer present (often called the "rag" layer) which includes, for the most part, the hydrocarbons, solids, and other materials (with certain limited exceptions) mixed together. This mixture was simply considered unusable waste or was utilized in alternative processes not designed to capture the hydrocarbons for processing. For example, the wastes could be burned to produce electricity or could be used as part of a raw crude feed. Further, oil is also commonly trapped in the solids layer resulting in these including a large amount of oil and potentially needing to be treated as hazardous.

The reason that the rag and solid layers were uninteresting is that processes for wastewater treatment were generally focused on cleaning the water in the system and water reclamation. While capture of easily segregatable oil was seen as beneficial since it could be used as refinery feedstock, the primary purpose of removing it was to assist in cleaning the water, not in capturing the oil. This lack of focus on oil reclamation and therefore a relatively large percent of valuable hydrocarbons (often greater than 75% of crude oil originally in the wastewater stream) was simply disposed, generally by the rag and solid mix being used as an inefficient combustion source.

When crude oil prices are relatively low, this is not a particularly big issue as lost hydrocarbon material is simply a small cost of doing business in the hydrocarbon area. However, as oil prices go up, and as there becomes increasing public and environmental concern for disposal of potentially hazardous (and potentially useable) materials in landfills and other waste disposal sites, interest in obtaining additional amounts of "waste oil" from within waste streams and allowing that oil to be processed and used is increasing. Further, combustion of oil, water, and contaminant mixtures can result in the release of undesirable materials into the air (such as sulfurs and metals), which presents a further concern.

Further, most wastewater (and oil) storage vessels also require periodic cleaning. Crude oil is generally sticky and will adhere to most surfaces. Therefore, water is often used to clean tanks, pipes, and other vessels where oil has been present and this water also requires clarification in order to remove the oil. Wastewater can also be generated from oil cleanup activities such as tanker spills and from oil drilling operations. Thus, there can be significant amounts of wastewater present in the handling of hydrocarbons which are not only generated as part of operations, but are created through the actions of cleaning or accidents. These wastewaters, again, have generally been treated for clarification of water and the loss of valuable oil was simply seen as a cost of doing business.

SUMMARY

Because of the above problems in the art, described herein are certain systems and methods which are designed to improve the removal and capture of oil from wastewater streams. In its most basic form, the wastewater and oil mixture is diluted and treated to provide better solubilization of hydrophilic and hydrophobic fractions using captive water and a diluent. Two additives are added to demulsify and disperse polymeric and non-hydrocarbon insolubles and layer separation is again performed on the treated wastewater. This allows greater recovery of oil/hydrocarbon derivatives while minimizing and concentrating tank inorganics and sludges. The process thus serves not only to clean resultant discharge water, but to allow for waste oil to be captured in a form fit for further refining, and to remove hydrocarbons from solid sludges allowing for easier disposal.

There is described herein, among other things, a method for capturing waste oil, the method comprising: providing a wastewater comprising, oil, water, and solids; agitating the wastewater and allowing the wastewater to phase; removing a portion of the oil from the phased wastewater; mixing a diluent, a solvent additive, and a detergent salt to the wastewater after the removing to form a wastewater solution; agitating the wastewater solution and allowing the wastewater solution to phase; and separating a further portion of the oil from the wastewater solution.

In an embodiment of the method, the detergent salt comprises at least of: sodium percarbonate or hydrogen peroxide.

In an embodiment of the method, the solvent comprises at least one of: hydrochloric acid, phosphoric acid, an organic amine, ammonia, or ammonium hydroxide.

In an embodiment of the method, the diluent comprises an aliphatic hydrocarbon such as, but not limited to, diesel, methanol or steam.

In an embodiment of the method, the detergent salt comprises sodium percarbonate; the solvent comprises ammonium hydroxide; and the diluent comprises diesel possibly in conjunction with steam.

In an embodiment of the method, the detergent salt comprises sodium percarbonate; the solvent comprises phosphoric acid; and the diluent comprises methanol.

In an embodiment of the method, the wastewater solution is heated during the agitation. The heat may be between 70° F. and 170° F. or between 150° F. and 200° F.

There is also described herein, a method for capturing waste oil, the method comprising: providing in a first vessel a wastewater comprising, oil, water, and solids; agitating the wastewater in the first vessel and allowing the wastewater to phase; removing a portion of the oil from the phased wastewater; transferring the phased wastewater to a second vessel; mixing a diluent, a solvent additive, and a detergent salt to the phased wastewater after the transferring to form a wastewater solution; agitating the wastewater solution in the second vessel and allowing the wastewater solution to phase; separating a further portion of the oil from the wastewater solution.

There is also described herein a system for capturing waste oil, the method comprising: a first vessel including a wastewater comprising, oil, water, and solids; a first mechanical agitator for agitating the wastewater in the first vessel; a pump for removing a portion of the oil from the wastewater in the first vessel; a second vessel including a wastewater comprising, oil, water, solids, a diluent, a solvent additive, and a detergent salt; a second mechanical agitator for agitating the wastewater in the second vessel; and a pump for removing a portion of the water from the wastewater in the second vessel.

BRIEF DESCRIPTION OF THE DRAWINGS

FIG. 1 shows a functional block diagram of an embodiment of an oil recovery process of the present invention.

DESCRIPTION OF PREFERRED EMBODIMENT(S)

This disclosure will discuss systems, methods, and materials for the separation of useable waste oils from wastewater streams or other forms of oil-based waste. It should be recognized that this disclosure is primarily focused on the capture of useable waste oils which would otherwise have been discarded as waste as part of an oil, water, and particulate mixture.

As used herein, the term "waste oil" is used to refer to any hydrocarbon compound which is present in a waste stream from any form of hydrocarbon operation. This can include, but is not limited to, wastewater streams from oil refineries, chemical manufacturing operation, steel manufacture, metal finishing operations, or pharmaceutical production. Generally, waste oil will comprise crude oil (of any type), but may also comprise hydrocarbon components of crude oil such as, but not limited to, hydrocarbon derivatives. The term "waste oil" can also be used to describe oil which is not part of a water stream, but which is currently intended to be disposed of due to having an increased contaminant load (such as used motor oil) or is otherwise considered unsuitable for additional processing in its current state.

In effect, any form of hydrocarbon which is generally accepted as being "oil" as that term is used in the art, is "waste oil" if the hydrocarbon is in a form where it cannot be used or further refined to form an oil product due to the presence of water and other compounds. Therefore, the combination would generally be treated as waste even though it would be useable as an oil product if it could be separated from solubized materials, solids, and water. It should be recognized that compositions including waste oils are not useless and not necessarily simply disposed of, for example they may be burned to produce heat and therefore electricity, they are simply not useable as a refinery feedstock or to produce oil products (e.g. crankcase oil) or as a crude oil input in their current states.

A "wastewater" as contemplated herein is any waste stream that in addition to waste oil also includes some water. This may be due to the presence of naturally occurring water (such as water which is generally naturally present in crude oil) or may be due to the addition of water by human activity such as through the cleaning of tanks, through prior refining steps (such as dewatering), or through its addition in other processing steps. The water may also be present due to being part of the contaminant load of the waste oil, as is often the case in used motor oil. It is not necessary that there be more or less water to oil in the mixture and the ratio will generally depend on the specific form of wastewater and waste oil that are present. For example, used motor oil (waste oil) is also considered a wastewater as contemplated herein although it may only have 8% or less water in the mixture. In effect, any combination of water and oil which would require removal of water prior to refining the oil is classified herein as a wastewater.

A "tank" as contemplated herein is any tank which is used to hold wastewater for further processing and may comprise any such tank at any relevant facility which produces or handles wastewater. In embodiments, a tank may comprise, but is not limited to, a basic waste tank, a slop tank, or a frac tank.

"Solids" as contemplated herein are particulate contaminants present in waste oil and/or wastewater. Solids will generally be insoluble in both oil and water, but may be suspended in either or both in a wastewater stream. Further, solids may be trapped in an oil matrix, or may trap oil in a matrix, and thus not easily miscible from a wastewater or waste oil. Most solids will be inorganic and many will comprise metals or ash.

FIG. 1 provides a general block diagram of an embodiment of a system which can be used for performing a waste oil recovery process. The process is designed specifically to recover oils (101) and (601) (generally with about 90% or more waste oil in the wastewater (501) being recovered), clarify process water (and/or the water present in the wastewater) (105) and (605), and concentrate inorganic (non-hydrocarbon) solids into a more easily handled and disposable sludge (607). This sludge (607) comprises relatively oil free water with a high concentration of solids. In effect, the process serves to increase the amount of useful oil (that is oil suitable as a refinery feedstock) (101) and (601) which is captured from any given wastewater (501) relative to prior processes acting on the same wastewater (501).

The recovery systems utilize a waste tank (100) which includes an initial wastewater (501) stream upon which the process is be performed. This waste tank (100) is generally a feed for the present system and will generally be a part of existing waste handling processes, but that is by no means required and in alternative embodiments, the waste tank (100) may be specifically added for storage, or may be eliminated with all steps being performed in a single process tank (203).

The wastewater (501) will generally comprise oil, water, and solids in any ratio. Further, other materials such as oil additives may be included and this can include items such as, but not limited to, acids (such as sulfuric acid) and salts. The wastewater (501) may be sourced from any location, or may comprise a mixed material sourced from multiple locations and mixed. Depending of the embodiment, it will be expected that the wastewater (501) can include any or all of: used crankcase oil, other used oils, refinery waste, water used in tank cleaning operations, contaminated water from tanker spills, and/or other forms of wastewater and/or waste oil.

Generally, the waste tank (100) will have been previously exposed to mechanical agitation and/or centrifuging and allowed to phase into layers to provide a first level of material separation. The uppermost layer (101) will generally comprise oils and other hydrocarbons in a sufficiently pure form (lacking base sediment and water) to be processed through further refining. The second layer (103) is the rag layer which will generally comprise oil and water mixture possibly with suspended solids. The third layer (105) will generally comprise water that is process clean and could be clarified and returned to the environment. The final lowest layer (107) comprises sludge which is essentially water with a high percentage of solids. It should be recognized that depending on the nature of the wastewater (501) input, these various layers may be present in virtually any ratio.

In the process, the first step is to suction pump, or otherwise skim from the top of the tank (100), the free floating hydrocarbons/oils of layer (101). Centrifuging and other mechanical methods may be used to obtain the free floating oils (101) in other embodiments. The free floating oils (101) are essentially the easy to separate hydrocarbons which require relatively minimal processing and will usually comprise about 20% to about 30% of the oil currently in the waste tank (100). The free oil (101) will be fed to a filter (201), which may be any type of filter known to one of ordinary skill, however, bag/cartridge filtration is generally preferred as it is less invasive. A 25 micron bag filter may be used in one embodiment.

The filter (201) will segregate oil and other useful hydrocarbons (301) and the material will be monitored and filtered to the required specification of 1% max basic sediment and water (BS&W) crude oil to be ready for processing. Once sufficiently clarified, the oil (301) can be processed by a refinery in the standard fashion, or stored or shipped for another purpose.

Once the free hydrocarbon oil of layer (101) is removed, the remaining three phases of material comprises a wastewater (503) which (with the possible exception of water layer (105)) has previously been simply disposed of. In order to obtain value from the waste oil present therein (which can often be significant), the process of the present embodiment continues. The wastewater (503), which is essentially the wastewater (501) with the easily removable oil (101), and possibly the water (105), removed, will be transferred to a process tank (203).

The process tank (203) is generally an outside conical and agitated (233) process tank for additional processing. In an embodiment the process tank (203) is a frac tank generally having a capacity of around 500 bbl which will be significantly less than the capacity of the waste tank (100). While use of a process tank (203) is preferred as its use can reduce downtime of the waste tank (100) by allowing the wastewater (503) to be processed even while the waste tank (100) is in use (e.g. it is agitating the wastewater (501) therein or is being filled), it should be recognized that the processes performed in the process tank (203) can be performed in the waste tank (100) in an alternative embodiment.

As can be seen in the depicted embodiment, in the process of sending the remaining water contents (103), (105), and (107), which is essentially a wastewater (503) with reduced oil content compared to wastewater (501), to the process tank (203) the water layer (105) may be passed through a filter (205) so as to clarify it to meet desired standards. This water (305) is then available for feeding into the process tank (203), may be returned to the waste tank (100), or may be sent downstream for final treatment and discharge (315), if desired. In an alternative embodiment, the filter (205) is eliminated and water (305) is not segregated. Instead, the water layer (105) is simply fed directly into the process tank (203) along with the other layers (103) and (107).

As other materials will be removed from the water (105) in the process tank (203), the additional filtering step (205) is generally only necessary if clarified water (305) from the system is desired. This may be the case if the initial percentage of water is undesirably high or if clarified water (305) may be useful for reintroduction into the process elsewhere, such as, but not limited to, as steam (407). Alternatively, clarified water (305) may be removed from the system for further treatment (315) to allow for process water to be returned to the environment.

In the process tank (203), three components are added to the wastewater (503). The first additive (401) is a diluent, which is used to thin the wastewater (503) for more ready agitation and to begin the process of additional oil (601) separation. Steam (407) may also additionally or alternatively be used as a diluent. The second additive (403) is a balancer and is often a solvent. This generally serves to further thin the material, to potentially dissolve various constituents, and to alter the chemical environment of the wastewater (503) for introduction of the third additive (405). As such, the second additive (403) may be chosen to alter the alkalinity of the wastewater (503) or due to it being a solvent for certain known contaminants. The third additive (404) is a detergent salt that is designed to break apart crystalline structures and matrices to free trapped oil (601). While the materials will generally be added in the order discussed above, this is by no means necessary and in alternative embodiments the additives (401), (403), (405) and (407) may be added in alternative orders, or simultaneously.

Depending on the exact composition of the wastewater (503), the specific constituents of the additives may vary. For example, diluents of steam (407) and an aliphatic hydrocarbon (401) will be added to thin the respective hydrocarbon and aqueous layers generally in cases where there is more water present in the wastewater (501) and/or (503). The aliphatic hydrocarbon (401) may be any aliphatic hydrocarbon and can comprise well known aliphatic hydrocarbons as well as proprietary aliphatic hydrocarbons or any blend. In an embodiment, the aliphatic hydrocarbon (401) comprises diesel. The aliphatic hydrocarbon (401) will generally be heated prior to addition in order to provide for easier separation in the process tank (203), but this is by no means required.

Steam (407) is also preferably added to the tank (203) to further increase temperature for separation. Temperature in the process tank (203) is preferably elevated above ambient (e.g. any temperature above 70° F. may be used), but in an embodiment is maintained at or below 150° F., at or below 160° F., at or below 170° F., at or below 180° F., at or below 200° F., Between 150° F. to 160° F., between 160° F. and 170° F., between 170° F. and 180° F., or between 180° F. and 200° F. Increased temperature can serve to further dilute and thin the mixture to provide for improved separation.

The use of the aliphatic hydrocarbon (401) and introduction of heat (407) is generally used to dilute the wastewater (503). As should be apparent, clarified water (305) may have been removed and, depending on the thickness of the wastewater (501) input, the wastewater (503) in the process tank (203) may be quite viscous. As the process in the process tank (203) involves agitation (as discussed later) and phasing, making the wastewater (503) less viscous (and therefore easier to agitate and phase) can assist in waste oil (601) separation. A thinner wastewater (503) will also generally increase the speed at which the various components of the wastewater (503) can flow relative to each other, and thus phase into layers, and thinner solutions, particularly with more water, can inhibit water from becoming trapped in oil in the form of an emulsion, which may be stable for a relatively long period of time. Thus, diluents (401) and (407) are often chosen to speed up the process, not necessarily because they actually act on the separation of water, contaminants, and oil directly.

As part of the treatment process involves segregating oil from water, the inclusion of additional water to dilute the wastewater (503) may be undesirable as it has to be later removed. Thus, the use of a diluent (401) which does not result in the addition of extra water is often preferred. However, as water (105) may already be present, it will often not be removed prior to transfer to the process tank (203) to allow the wastewater (503) to maintain the same original water amount. Alternatively, as shown in FIG. 1, water (105) may be removed, clarified (305), and then returned as steam (407), to allow the process to not add additional water to the wastewater (501) and be relatively self-contained. Further, it is generally preferred that the diluent (401) be generally hydrophobic and miscible with waste oil as this can result in further faster phasing after agitation steps by pushing water (605) away from the oil (601).

Concurrently or sequentially to the diluent (401) and (407) addition, the next two additives (403) and (405) are also added to the wastewater (503) in the process tank (203). These additives are provided to chemically break down sludges (107) and rag (103) portions of wastewater (501), to react with detergent anionic surfactants to break emulsions, and to neutralize residual acids or adjust pH. They are often to specifically breakup matrices or other structures which could be trapping oil (601) and/or heavy metals in the wastewater (503) and inhibiting it from being separable by agitation. In an embodiment they may be provided in a ratio of about 1% to about 5% to the underlying waste, more presumably about 1% to about 2%. However, one of ordinary skill would understand that each waste stream is different and therefore more or less additive(s) may be used based on the specific waste being treated.

Additives are preferably chosen that are environmentally-friendly and will not produce negative and hard to remove materials in the wastewater (503) so as to provide clarified water (605) which does not require special additional treatment prior to being sent downstream for processing and discharge (315). However, that is by no means necessary. Additives (403) and (405) are also preferably selected which will not negatively impact the quality of recovered specification water (605) and oil (601) phases as the primary system is designed not only to segregate clarified water (605), but to allow for crude oil (601) to be captured and processed. As should be apparent, the diluent (401) and the additives (403) and (405) may both work together with both acting as a partial solvent and partial diluent in the process.

In an embodiment, the second additive (403) is primarily utilized for pH adjustment and solubility of acid salts, mainly those from sulfur and comprises an amine, ammonium hydroxide, and/or ammonia. This additive (403) is particularly useful in wastewaters (503) that are relatively thin and include a relatively high percentage of water. In thicker wastewaters (503) and those that are more alkaline, reactions with ammonia may produce an increased amount of solid salts and additional diluent (401) or (407) may be required. Organic amines, ammonium hydroxide, or ammonia are generally preferred with ammonia or ammonium hydroxide generally being more preferred as the additive (403). Ammonia is inexpensive and easily neutralized to a water-soluble salt as part of water clarification (305) and (315) and, thus, can be easily removed if necessary. Higher amines are believed to work slightly better in the process, but can create organic issues requiring higher recovery costs, and therefore specific amine selection is at least partially based on cost issues compared to oil (601) amounts recovered.

While the above describes a first preferred embodiment of diluent (401) and solvent/balancing additive (403), alternative materials may also or additionally be used in alternative embodiments. Such alternatives are believed to be beneficial when used with waste crankcase oil (as wastewater (501)) or similar materials as such a wastewater (501) usually includes a higher percentage of contaminants (including solids and additives such as detergents), but a lower percentage of water. However, any embodiment can be used on any type of wastewater (501), on a stream made up from both types of wastewater (501), or on any other material containing waste oil.

In more viscous wastewater (503), those that include a higher percentage of solids but lower water, it is preferred that the additive (403) is methanol which can act as both a diluent and a solvent and the diluent (401) is an acid such 12% Hydrochloric acid (HCl). While hydrochloric acid can be particularly useful as a diluent (401), it can be damaging to the process tank (203) and therefore may be replaced with a less damaging acid such as phosphoric acid or other weaker acid in another embodiment. However, ion-exchange from such acids may create free sulfuric acid and corrosive material in the sulfuric acid. Thus, acids may be chosen to inhibit this process, or materials may be used to inhibit its danger to the tank (203). Steam (407) may also be used as discussed above to provide further dilution and heat.

In an embodiment of a process involving used crankcase oil, the wastewater (503) may comprise less than about 60% by volume of the tank, methanol comprise about 15% by volume of the wastewater (503), and sodium percarbonate be provided at about 1% by weight in 10% by volume water. The HCl then comprises about 15% by volume to the wastewater (503). In an embodiment, there is provided about 12,000 gallons of wastewater (503) to which is added 1,800 gallons of methanol, 900 pounds of sodium percarbonate in 600 gallons of water, and 1800 gallons of HCl. Agitation prior to HCl addition can run for about 2-3 hours with agitation continuing for about another hour after HCl addition.

In a still further embodiment, in order to accelerate precipitation of the water/acid/methanol about 1% calcium chloride can be added during the agitation. This can be obtained directly or lime (calcium hydroxide or calcium oxide) could be used as a precursor and formed into the calcium chloride.

Regardless of what is used as the diluent (401) and additive (403), after they have been added, the wastewater (503) will generally have been thinned and free oils (601) may have already begun to separate from water (605). At this stage, oil (601) could potentially already be separated out from waste water (503). However, in a preferred embodiment, the third additive (403) is added to break loose trapped oils. It should be noted that all the additives may be added simultaneously, but the third additive (405) will often be highly reactive with the wastewater (503) and, therefore, may be added later to prevent the reaction from being overly powerful.

In an embodiment, the third additive (405) is a detergent salt that attacks polymers and other inorganics by causing them to flocculate and, thus, allowing trapped oil to break free. It is generally preferred that the detergent salt be buffered and have oxidizing capabilities. In an embodiment, the detergent salt is preferably sodium percarbonate or another stabilizer and clarifier of hydrogen peroxide. Alternatively, hydrogen peroxide may be used directly. The flocculated polymers and similar wastes generated by the addition are allowed to take on a semi-crystalline structure in the wastewater (503) making them able to precipitate more readily out of good hydrocarbon oil (601) and water (605) layers as solids (607).

The third additive (405) will generally also oxidize some emulsified oil and can attack darker color bodies to allow for easier visual segregation of oil (601) and water (605) layers in the process tank (203). This can assist in determining the line of segregation between the various fluid layers when they are separated. Because the specific composition of wastewater (503) is likely to change radically depending on the input wastewater (501) used, visual determination of the phases (601), (603), (605) and (607) may be necessary and simplification and clarification of the phases can potentially result in less waste and more recoverable water (605) and oil (601).

Most additives (405) are highly water-soluble salts with little solubility with oil. Thus, the oil (601) is generally forced to phase to the top layer in the process tank (203). The reaction may be exothermic and release heat, which may be beneficial for separation by acting as a diluent as discussed above, may be bled off or eliminated, or may be fed into the steam (407) generation portion of the process.

After addition of the additives (403) and (405) and diluents (401) and (407), the process tank (203) is agitated by an agitator (233) and then allowed to phase into layers similar to those found in the waste tank (100). In an embodiment, the addition of additives (403) and (405) and/or diluents (401) and (407) is performed during agitation to speed up the process. As was discussed in conjunction with tank (100), agitation may be any form of agitation including, but not limited to, stirring, cycloning, or centrifuging. This secondary agitation may also be performed under added heat. Ideally, the agitation would be sufficient to result in about 5 complete turnovers of the tank (203) if a circulation pump was being used. Heat may be to any level, but in an embodiment is sufficient to maintain the wastewater (503) at a temperature of about 150° F.

In the process tank (203) after agitation, generally an increased amount of hydrocarbon oil (601) will have been released from the wastewater (501) and the initial rag water (103) and sludge (107) components will have had oil broken therefrom due to the inclusion of the additives (403) and (405) and diluents (401) and (407). Specifically, the various additives (403) and (405) and diluents (401) and (407) will serve to thin the wastewater (503) to encourage oil (601) and water (605) separation from the rag (103) as well as separation of trapped oil (601) from the sludge (107).

Once the wastewater (503) is sufficiently phased, it will generally be in layers (601), (603), (605) and (607) comparable to layers (101), (103), (105), and (107) as shown in FIG. 1. Treatment of this phased material is generally the same and oil (601) can again be drawn off from the top using a suction pump or other device as is known to those of ordinary skill. Alternatively or additionally, water (605) can be decanted from the bottom or forced out through adding additional circulating water to induce vortex behavior.

In the process tank (203), the rag layer (603) will generally be significantly reduced (around 1-2% of the total volume) compared to the rag layer (103) of the waste tank (101) as the rag layer (103) was one of the primary inputs of wastewater (503). The rag layer (603) may be sent for further processing (including additional processing by the methods discussed herein), may be disposed of in the traditional fashion, may be combined with the water layer (605) for further treatment or processing, or may be fed back into the waste tank (100).

It is generally preferred that the process tank (203) be emptied not be skimming the oil layer (601) but by vortexing the water (605) to remove that and then removing the rag layer (603) via gravity flow so as to not induce any vortexing in the oil (601). Recovered oil (601) can generally be captured directly and sludge (607) can be removed. Additional filtering may be utilized depending on the specific end product desired as indicated in FIG. 1.

The top oil/oil solids layer (601) of the process tank (203) is generally sent through a shale shaker system (209) of preferably 50 micron size to remove flocculated solids which may be present therein and that have not settled into the sludge (607) which are collected for disposal. The oil (601) passing through the shaker (209) may again be polished through filter system (201) and confirmed for release as specification 1% BS&W hydrocarbon crude oil (301).

The bottom aqueous sludge (607) are also vacated from the process tank (203) for clarification. The bulk of the sludge (607) which is generally a pumpable semi-solid mass will be passed through a shale shaker (207) of preferably 50 micron size. The mechanism of the shaker (207) is such that the large majority of the water (707) will generally be allowed to pass through the system leaving a large percentage of the sludge (607) in a concentrated form to be sent to a roll-off for ultimate disposal. This can either be through landfilling or through other commercially acceptable means of disposal.

As the sludge (607) will generally have few hydrocarbons remaining (especially compared to sludge (107)) and will instead generally comprise inorganic solids. The sludge (607) will generally not be suitable for return to the process or for use as a combustion fuel since it has had substantially all the hydrocarbons removed, but may include valuable elements which can be removed and recaptured through further processing, if desired. For example, particles of iron may be removed from the sludge (607) using methods known to those of ordinary skill.

Water (707) from the shaker (207) will either be re-used as waste tank (100) or process tank (203) diluents (e.g. as steam (405)), or may alternatively be polished through a 25 micron bag filter or other similar filter to ensure reduction of sediments below the 3% specification for treatment plant water in-feed. The water can then be sent for treatment and discharge (315).

Once the process tank (203) is empty, a further batch of wastewater (503) from the waste tank (100) can be provided and the process can be repeated. A secondary (or other additional) process tank(s) may be included in this process to further reduce any downtime and to produce a more continuous process. This secondary process tank can be charged, treated, and allowed to phase, while the first process tank (203) is being evacuated for filtration and disposition of all phased layers. In this manner a continuous cycle can be maintained by cycling through multiple process tanks. This can also allow the wastewater (501) in waste tank (100) to be processed quicker, if that is desirable. If required, additional such process tanks (203) can be provided so as to generate an essentially continuous process. Bag filters (201) and (205) and shakers (207) and (209) may also be provided in multiple for the same purpose to provide continuous or near continuous processing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

The invention claimed is:

1. A method for capturing waste oil, the method comprising:
providing a wastewater comprising, oil, water, and solids;
agitating said wastewater and allowing said wastewater to phase;
removing a portion of said oil from said phased wastewater;
mixing a diluent, a solvent additive, and a detergent salt to said wastewater after said removing to form a wastewater solution;
agitating said wastewater solution and allowing said wastewater solution to phase; and
separating a further portion of said oil from said wastewater solution.

2. The method of claim 1 wherein said detergent salt comprises sodium percarbonate.

3. The method of claim 1 wherein said detergent salt comprises hydrogen peroxide.

4. The method of claim 1 wherein said solvent comprises hydrochloric acid.

5. The method of claim 1 wherein said solvent comprises phosphoric acid.

6. The method of claim 1 wherein said solvent comprises an organic amine.

7. The method of claim 1 wherein said solvent comprises ammonia.

8. The method of claim 1 wherein said solvent comprises ammonium hydroxide.

9. The method of claim 1 wherein said diluent comprises an aliphatic hydrocarbon.

10. The method of claim 1 wherein said diluent comprises diesel.

11. The method of claim 1 wherein said diluent comprises methanol.

12. The method of claim 1 wherein said diluent comprises steam.

13. The method of claim 1 wherein:
said detergent salt comprises sodium percarbonate;
said solvent comprises ammonium hydroxide; and
said diluent comprises diesel.

14. The method of claim 13 wherein:
Said diluent also comprises steam.

15. The method of claim 1 wherein:
said detergent salt comprises sodium percarbonate;
said solvent comprises phosphoric acid; and
said diluent comprises methanol.

16. The method of claim 1 wherein said wastewater solution is heated during said agitation.

17. The method of claim 16 wherein said wastewater solution is heated to between 70° F. and 170° F.

18. The method of claim 16 wherein said wastewater solution is heated to between 150° F. and 200° F.

19. A method for capturing waste oil, the method comprising:
providing in a first vessel a wastewater comprising, oil, water, and solids;
agitating said wastewater in said first vessel and allowing said wastewater to phase;
removing a portion of said oil from said phased wastewater;
transferring said phased wastewater to a second vessel;
mixing a diluent, a solvent additive, and a detergent salt to said phased wastewater after said transferring to form a wastewater solution;
agitating said wastewater solution in said second vessel and allowing said wastewater solution to phase; and
separating a further portion of said oil from said wastewater solution.

\* \* \* \* \*